United States Patent
Saboune et al.

(10) Patent No.: US 10,048,755 B2
(45) Date of Patent: Aug. 14, 2018

(54) SYSTEMS AND METHODS FOR CONVERTING SENSORY DATA TO HAPTIC EFFECTS

(71) Applicant: IMMERSION CORPORATION, San Jose, CA (US)

(72) Inventors: Jamal Saboune, Montreal (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 8 days.

(21) Appl. No.: 14/663,585

(22) Filed: Mar. 20, 2015

(65) Prior Publication Data

US 2015/0268726 A1    Sep. 24, 2015

Related U.S. Application Data

(60) Provisional application No. 61/968,799, filed on Mar. 21, 2014.

(51) Int. Cl.
*G06F 3/041* (2006.01)
*G06F 3/01* (2006.01)
(Continued)

(52) U.S. Cl.
CPC .............. *G06F 3/016* (2013.01); *G06F 3/017* (2013.01); *G09G 5/18* (2013.01); *G11B 27/031* (2013.01); *H04N 5/04* (2013.01); *H04N 21/42202* (2013.01); *H04N 21/44218* (2013.01); *H04N 21/44222* (2013.01); *H04N 21/8126* (2013.01)

(58) Field of Classification Search
CPC .... G06F 3/016; G06F 3/03543; G06F 3/0338; G06F 3/03545; G06F 3/0362;
(Continued)

(56) References Cited

U.S. PATENT DOCUMENTS 7,623,114 B2    11/2009  Rank
7,979,146 B2     7/2011  Ullrich et al.
(Continued)

FOREIGN PATENT DOCUMENTS

WO    WO 2010/042884 A2    4/2010
WO    WO 2011/011737        1/2011

OTHER PUBLICATIONS

Bannach, D., et al., "Automatic Event-Based Synchronization of Multimodal Data Streams from Wearable and Ambient Sensors," EuroSSC 2009, LNCS 5741, 2009, pp. 135-148.
(Continued)

*Primary Examiner* — Duc Q Dinh
(74) *Attorney, Agent, or Firm* — Miles & Stockbridge PC

(57) ABSTRACT

A system includes a sensor, a processor configured to receive a signal output by the sensor, determine a position and descriptor of the sensor, determine a scene selection of a video, and create a haptic signal based on the selected scene, the signal output by the sensor, and the position and descriptor of the sensor, and a haptic output device configured to receive the haptic signal and generate a haptic effect based on the haptic signal. A system includes a sensor, a processor configured to receive a signal from the sensor, determine a type of event and activity associated with the sensor, and generate a haptic signal based on the signal from the sensor and the type of event and activity associated with the sensor, and a haptic output device configured to generate a haptic effect based on the haptic signal.

22 Claims, 3 Drawing Sheets

(51) Int. Cl.
*H04N 5/04* (2006.01)
*G09G 5/18* (2006.01)
*H04N 21/422* (2011.01)
*H04N 21/442* (2011.01)
*H04N 21/81* (2011.01)
*G11B 27/031* (2006.01)

(58) Field of Classification Search
CPC ........... G06F 3/03547; G06F 2203/013; G06F 2203/015; G06F 3/011; G06F 2203/014; G06F 21/32; G06F 1/1626; G06F 3/017; G06F 17/28; G06F 3/0414; G06F 2203/04802; G06F 1/163; G06F 1/3206; G06F 2203/0331; G06F 3/012; G06F 3/013; G06F 3/0202; G06F 3/0234; H01H 13/705; H01H 13/785; H01H 13/807; H01H 2201/036; H01H 2217/004; H01H 2217/012; H01H 2217/036; H01H 2219/012; H01H 2221/012; H01H 2225/022
USPC .................................................. 715/700–703
See application file for complete search history.

(56) References Cited

U.S. PATENT DOCUMENTS

| | | |
|---|---|---|
| 8,000,825 B2 | 8/2011 | Ullrich et al. |
| 8,378,964 B2 | 2/2013 | Ullrich et al. |
| 2005/0062841 A1 | 3/2005 | Rivera-Cintron |
| 2007/0236449 A1 | 10/2007 | Lacroix et al. |
| 2008/0223627 A1 | 9/2008 | Lacroix et al. |
| 2009/0096632 A1 | 4/2009 | Ullrich et al. |
| 2009/0128306 A1 | 5/2009 | Luden et al. |
| 2011/0125790 A1 | 5/2011 | Choi et al. |
| 2011/0202155 A1 | 8/2011 | Ullrich et al. |
| 2011/0215913 A1 | 9/2011 | Ullrich et al. |
| 2012/0206246 A1 | 8/2012 | Cruz-Hernandez et al. |
| 2012/0206247 A1 | 8/2012 | Bhatia et al. |
| 2013/0127755 A1* | 5/2013 | Lynn ........................ G08B 6/00 345/173 |
| 2013/0222565 A1* | 8/2013 | Guerin .................... A63F 13/10 348/77 |
| 2014/0093221 A1* | 4/2014 | Wikander ............ H04N 9/8205 386/248 |
| 2014/0205260 A1 | 7/2014 | Lacroix et al. |
| 2014/0243710 A1* | 8/2014 | Jeong .................... A61B 5/1116 600/594 |
| 2014/0318699 A1* | 10/2014 | Longinotti-Buitoni ................ A61B 5/0002 156/247 |

OTHER PUBLICATIONS

Extended European Search Report as issued in European Patent Application No. 15160184.6, dated Aug. 19, 2015.

* cited by examiner

SYSTEMS AND METHODS FOR CONVERTING SENSORY DATA TO HAPTIC EFFECTS

CROSS-REFERENCE TO RELATED APPLICATIONS

This application claims the benefit of priority from U.S. Provisional Patent Application Ser. No. 61/968,799, filed Mar. 21, 2014, the entire content of which is incorporated herein by reference.

FIELD

The present invention is related to systems and methods for converting sensory data to haptic effects, such as in sports media and user generated content media.

BACKGROUND

Adding compelling haptic effects at the right time in a video clip may improve the user's viewing experience and make the experience more immersive. This may be achieved by manually authoring the haptic effects and adding the haptic effects in a timeline. However, manually authoring the haptic effects can be time consuming for inexperienced users and even if users are willing to spend enough time to create relevant effects, they might not have the artistic touch that experienced haptic effects authors have, which may result in bad effects that could ruin the experience.

SUMMARY

It is desirable to provide systems and methods that automatically derive haptic effects for a media piece of content for which one or more sensors has captured data related to the action in the content.

According to an aspect of the invention, there is provided a system that includes a sensor, a processor configured to receive a signal output by the sensor, determine a position and descriptor of the sensor, determine a scene selection of a video, and create a haptic signal based on the selected scene, the signal output by the sensor, and the position and descriptor of the sensor, and a haptic output device configured to receive the haptic signal and generate a haptic effect based on the haptic signal.

In an embodiment, the processor is further configured to determine a desired haptic effect and create the haptic signal based on the selected scene, the signal output by the sensor, the position and descriptor of the sensor, and the desired haptic effect.

In an embodiment, the sensor is selected from the group consisting of: an accelerometer, a gyroscope, an inertial measurement unit, and a contact sensor.

In an embodiment, the system includes a user input device configured to allow a user of the system to indicate the position and/or descriptor of the sensor.

In an embodiment, the system includes a user input device configured to allow a user of the system to select the scene.

In an embodiment, the system includes a user input device configured to allow a user of the system to select the desired haptic effect.

In an embodiment, the processor is configured to synchronize a video of the selected scene with the haptic signal.

In an embodiment, the system includes a display configured to display the video of the selected scene synchronized with the haptic effect generated by the haptic output device.

In an embodiment, the system includes a plurality of sensors, and the processor is configured to receive signals output by the plurality of sensors, determine positions and descriptors of the plurality of sensors, and create the haptic signal based on the selected scene, the signals output by the plurality of sensors, and the positions and descriptors of the plurality of sensors.

According to an aspect of the invention, there is provided a method that includes receiving sensor data from a sensor, determining a position and descriptor of the sensor, determining a scene selection of a video, and creating a haptic signal based on the selected scene, the sensor data, and the position and descriptor of the sensor.

In an embodiment, the method includes synchronizing the selected scene of the video and the haptic signal.

In an embodiment, the method includes receiving sensor data from a plurality of sensors, determining positions and descriptors of the plurality of sensors, and creating the haptic signal based on the selected scene, the sensor data, and the positions and descriptors of the plurality of sensors.

According to an aspect of the invention, there is provided a system that includes a sensor, a processor configured to receive a signal from the sensor, determine a type of event and activity associated with the sensor, and generate a haptic signal based on the signal from the sensor and the type of event and activity associated with the sensor, and a haptic output device configured to generate a haptic effect based on the haptic signal.

In an embodiment, the sensor is selected from the group consisting of: an accelerometer, a gyroscope, an inertial measurement unit, and a contact sensor.

In an embodiment, the type of event is selected from the group consisting of: a bump event, a swing event, an acceleration event, a rotation event, a landing event, and a texture contact event.

In an embodiment, the activity is selected from the group consisting of biking, motocross, snowboarding, and skiing.

In an embodiment, the processor is further configured to synchronize a video of the event with the haptic signal.

In an embodiment, the system includes a display configured to display the video of the event synchronized with the haptic effect generated by the haptic output device.

In an embodiment, the system includes a user input device configured to provide input to the processor to select the haptic effect to be output by the haptic output device, and the haptic effect is selected from the group consisting of: a bump effect, a swing effect, a texture effect, an airtime effect, an acceleration envelope, and a rotation envelope.

According to an aspect of the invention, there is provided a method that includes receiving sensor data output by a sensor, selecting a type of event and activity associated with the sensor data, and generating a haptic signal based on the sensor data, the type of event and the activity.

In an embodiment, receiving sensor data output by the sensor includes receiving sensor data output by a plurality of sensors.

In an embodiment, the method includes synchronizing a video of the event and the haptic signal.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF DRAWINGS

The components of the following Figures are illustrated to emphasize the general principles of the present disclosure and are not necessarily drawn to scale. Reference characters designating corresponding components are repeated as necessary throughout the Figures for the sake of consistency and clarity.

DETAILED DESCRIPTION

Figure 1:
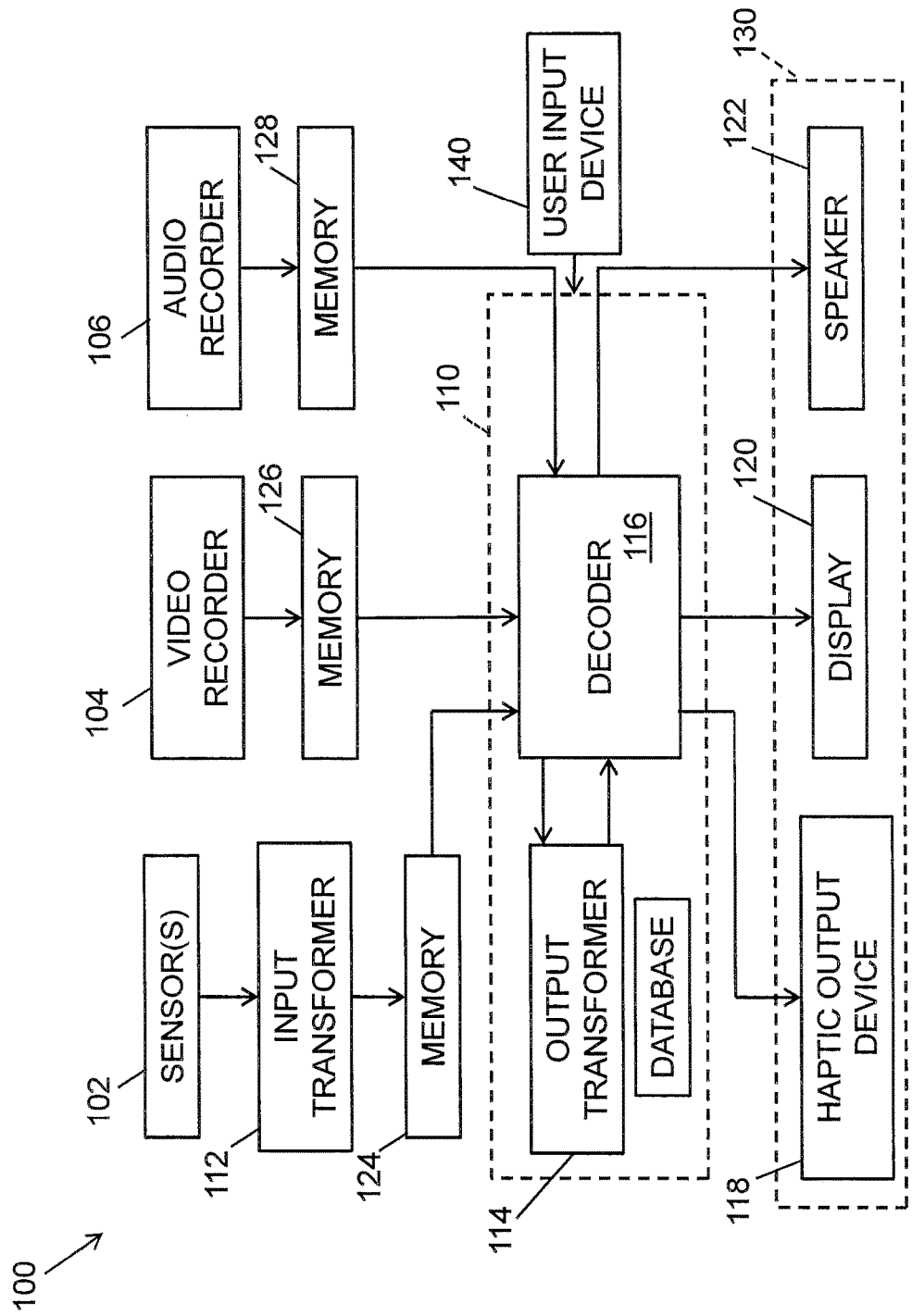
FIG. 1 is a schematic illustration of a system according to embodiments of the invention.

FIG. 1 illustrates a system 100 in accordance with an embodiment of the invention. As illustrated, the system 100 includes one or more sensors 102, which are configured to sense movement of an object and convert the sensed movement into sensor data, a video recorder 104 configured to capture and record images, and an audio recorder 106 configured to capture and record sound. In an embodiment, the sensor(s) 102, the video recorder 104, and the audio recorder 106 may be part of the same electronic device. In an embodiment, the video recorder 104 and the audio recorder 106 may be part of the same electronic device, and the sensor(s) 102 may be separate from the electronic device that includes the video recorder 104 and the audio recorder 106. In an embodiment, the sensor(s) 102, the video recorder 104, and the audio recorder 106 may be separate, stand-alone devices or part of separate, stand-alone devices.

A processor 110 is configured to process signals and data output by the sensor(s) 102, the video recorder 104, and the audio recorder 106, as discussed in further detail below. The system 100 also includes an input transformer 112, an output transformer 114, which may be part of the processor 110, and a decoder 116, which may also be part of the processor 110. Aspects of the input transformer 112, the output transformer 114, and the decoder 116 are discussed in further detail below.

As illustrated in FIG. 1, the system 100 also includes a haptic output device 118 configured to output haptic effects to a user of the system, a display 120 configured to display images, such as the images captured by the video recorder 104, and a speaker 122 configured to output sound, which may be the sound captured by the audio recorder 106. The haptic output device 118, the display 120, and the speaker 122 may be part of an electronic playback device 130, as discussed in further detail below. In an embodiment, the haptic output device 118, the display 120, and the speaker 122 may be separate devices that are configured to communicate with each other through a wireless connection, for example. In an embodiment, the haptic output device 118 may be part of a wearable device, the display 120 may be part of a television, and the speaker 122 may be a wireless speaker that is separate from the display 120.

The haptic output device 118 may include an actuator, for example, an electromagnetic actuator such as an Eccentric Rotating Mass ("ERM") actuator in which an eccentric mass is moved by a motor, a Linear Resonant Actuator ("LRA") in which a mass attached to a spring is driven back and forth, or an actuator that includes a "smart material" such as piezoelectric, electro-active polymers or shape memory alloys, a macro-composite fiber actuator, an electro-static actuator, an electro-tactile actuator, and/or another type of actuator that provides a physical feedback such as a haptic (e.g., vibrotactile) feedback. The haptic output device 118 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

Electronic memory 124 may be used to store data sensed by the sensor(s) 102, electronic memory 126 may be used to store data that is recorded by the video recorder 104, and electronic memory 128 may be used to store data that is recorded by the audio recorder 106. The memory 124, 126, 128 may include one or more internally fixed storage units, removable storage units, and/or remotely accessible storage units. The various storage units may include any combination of volatile memory and non-volatile memory. The storage units may be configured to store any combination of information, data, instructions, software code, etc. In embodiments in which the sensor(s) 102, the video recorder 104, and the audio recorder 106 are part of the same electronic device, the memory 124, 126, 128 may be co-located. In embodiments in which the video recorder 104 and the audio recorder 106 are part of the same electronic device, the memory 126, 128 may be co-located.

In an embodiment, a user may record video and/or audio of a scene or event using the video recorder 104 and/or the audio recorder 106. In an embodiment, the video recorder 104 and the audio recorder 106 may be part of the same recording device, such as a video camcorder, a smartphone, etc. The video and audio that is recorded may be stored in the electronic memory 126, as discussed above. In an embodiment, the sensor(s) 102 may be placed on an object of interest, such as an object being recorded in the video.

As discussed above, the data generated by the sensor(s) 102 may be stored in the electronic memory 124. In addition, the data generated by the sensor(s) 102 may be transformed by the input transformer 112 prior to being stored in the electronic memory 124, as illustrated in FIG. 1. The transformation of the sensor data is considered to be an optional step and whether the transformation is needed may depend on the nature of the sensors being used. Details of embodiments of the sensor(s) 102 are discussed in further detail below.

The decoder 116, which may be part of a media player configured to playback the video, i.e. media file, is configured to read the data generated by the sensor(s) 102 from the electronic memory 124, and associate the data temporally with the audio data and video data that were recorded and stored in the electronic memory 126. During media playback, the decoder 116 may pass the sensor data through an output transformer 114 configured to transform the sensor data into a haptic output signal or haptic sensory commands, which include but are not limited to, vibration, surface friction modulation, skin pinch, skin squeeze, etc. The decoder 116 may be configured to synchronize the haptic output signal that was transformed from the sensor data with the video data and the audio data so that the haptic effect is synchronized with the video and audio during playback. In an embodiment, the synchronization may be completed by ensuring that time is the same in the video data, the audio data, and the haptic effect during playback.

The system 100 may also include a user input device 140 that is in signal communication with the processor 110 and configured to allow a user to input data into the system. For example, the user may input data by selecting parameters related to the sensor(s) 102 and haptic effects, as described in further detail below. The user input device 140 may include a display configured to display the parameters in a menu or other type of list format. In an embodiment, the user input device 140 may be part of the playback device 130. In an embodiment, the user input device 140 may be part of the video recorder 104. The illustrated embodiment is not intended to be limiting in any way.

The processor 110 may be a general-purpose or specific-purpose processor or microcontroller for managing or controlling the operations and functions of the system 100. For example, the processor 110 may be specifically designed as an application-specific integrated circuit ("ASIC") to control output signals to the haptic output device 118 to provide haptic effects. The processor 110 may be configured to decide, based on predefined factors, what haptic effects are to be generated, the order in which the haptic effects are generated, and the magnitude, frequency, duration, and/or other parameters of the haptic effects. The processor 110 may also be configured to provide streaming commands that may be used to drive the haptic output device 118 for providing a particular haptic effect. In some embodiments, the processor 110 may actually include a plurality of processors, each configured to perform certain functions within the system 100. The processor 110 may also include memory that includes one or more storage devices that may include haptic effect profiles, instructions for how the haptic output device 118 is to be driven, and/or other information for generating haptic effects. In an embodiment in which the entire system 100 illustrated in FIG. 1 is part of a single electronic device, the memory 124, 126 may be part of the processor 110.

The haptic output signal may then be transmitted from the processor 110, e.g., from the decoder 116 of the processor 110, to the haptic output device 118 so that the person(s) experiencing the media through the electronic playback device 130 that includes the haptic output device 118 may more fully experience the event being played back. The electronic playback device 130 may be any device, such as an electronic handheld device, such as a mobile phone, gaming device, personal digital assistant ("PDA"), portable e-mail device, portable Internet access device, calculator, tablet, etc. The electronic playback device 130 may include, but is not limited to, a handheld device with the display 120, which may be a high definition display, that displays the media, a handheld object that is capable of producing haptic sensations or effects, or an object attached to the user's body, leaning up to the user's body, or otherwise able to transmit tactile sensations and haptic effects to the user.

In an embodiment, the processor 110 and the haptic output device 118 may be part of an electronic handheld device, which may be a phone or a tablet, and the electronic handheld device may be configured to output the video data to a separate display 120, which may be a television.

In an embodiment, the system 100 may include a mobile phone having a gyroscope, a compass, and three-axis accelerometer sensors for the sensors 102, as well as a built-in camera for the video recorder 104. In this instance, all of the components illustrated in FIG. 1, including the data recording sensor(s) 102, video recorder 104, audio recorder 106, processor 110 including the decoder 116 and output transformer 114, haptic output device 118, display 120, speaker 122, input transformer 112, and electronic memory 124, 126, 128 may be self-contained, and the entire system 100 may be affixed to the person or a piece of equipment performing the activity of interest.

In an embodiment, a first-person perspective video camera may be mounted to a helmet or piece of equipment performing the activity of interest, and the video camera may incorporate a number of data sensors 102, such as accelerometers, a global positioning system ("GPS"), and gyroscopes, the input transformer 112, if needed, the electronic memory 124, the video recorder 104, the audio recorder 106, and the electronic memory 126. The remaining parts of the system 100, such as the processor 110 including the decoder 116 and output transformer 114, the haptic output device 118, the display 120, and the speaker 122, may be located in a separate playback device, such as the electronic playback device 130, as discussed above.

In an embodiment, the sensor(s) 102, which may include one or more data sensors, such as accelerometers, GPS, etc., may be affixed either to the person or to equipment performing the activity of interest. The sensor(s) 102 may be contained in a sensor box, or some other container that is configured to protect the sensor(s) 102. The sensor box may have data recording means, such as the input transformer 112 and the electronic memory 124, built-in, or may rely on a data connection to secondary device (such as a mobile device) to record the data during the activity.

In an embodiment, the sensor(s) 102 may be installed on a person who is the subject of the video, and the video recorder 104, and optionally the audio recorder 106, may be operated by another person. For example, the person who is the subject of the video may be a biker, snowboarder or skier and at least one sensor 102 may be attached to the person's piece of clothing or equipment, such as the snowboarder's boot, helmet, or snowboard. The sensor(s) 102 may include accelerometers configured to provide the g-force accelerations experienced by the snowboard, gyroscope sensors configured to provide the orientation of the snowboard, and contact pressure sensors configured to provide the load applied to the snowboard by the snowboarder's boots. In an embodiment, the audio recorder 106 may be attached to an article of clothing or equipment, such as a helmet of the snowboarder so that the sound of the snowboard passing over the snow may be captured.

In an embodiment, a recording session may be initiated in which the stream of acceleration data, gyroscope data, and contact pressure data is recorded alongside the video and audio data. The video recorder 104 and/or audio recorder 106 may be mounted to the snowboarder's helmet, for example. In an embodiment, the video recorder 104 and/or audio recorder 106 may be an array of video cameras mounted at various locations in a snow park's half pipe, where the snowboarding activity is to be performed. In an embodiment, the video recorder 104 may be an array of video cameras located at various locations in a snow park's half pipe and the audio recorder 106 may be mounted to an article of clothing or equipment of the snowboarder, as described above. Other combinations of the locations of the sensor(s) 102, video recorder 104, and the audio recorder 106 may be used and may depend on the activity being recorded so that an optimum haptic/audio/visual experience may be realized by the user of the electronic playback device 130 during playback. The synchronization of all of these data streams may be managed by recording software, which may reside in the processor 110 of the system 100 illustrated in FIG. 1.

In an embodiment, flexible container formats, such as MPEG-4, that allow for the storage of data other than video and audio in a single file container, may be used. In such an embodiment, a particular set of encoders may be needed to place the sensor data into the MPEG-4 file during recording. In an embodiment, special software may be written to store the non-audio and video (A/V) sensor data in a separate file, but with special markers in the sensor data to allow for proper synchronization at playback time. In this embodiment, very little input transformation may need to be applied, beyond shaping the sensor data to conform to the limitations of the designed recording format. The exact format may be determined by the implementer. Once the snowboarder has completed his or her activity, the recording may be stopped. The MPEG-4 file may be closed, and all of the sensor data may reside in the MPEG-4 file.

In an embodiment, the playback device may be the electronic playback device 130 of FIG. 1, and may be in the form of a mobile phone or tablet having the display 120, the speaker 122, and a vibration device as the haptic output device 118 to provide the haptic effect. In an embodiment, the playback device may be a gaming console connected to a television having the display 120 and the speaker 122, and also connected to a gaming peripheral, such as a gamepad, that includes the haptic output device 118 to provide the haptic effect.

Either at a later time, or concurrently with the activity being performed, one or more viewers may be interested in experiencing the activity. To playback the activity, the viewer may launch the appropriate playback software on their playback device with the objective of experiencing the performer's activity. In an embodiment, the playback software may include a player software application that incorporates the sensor decoding scheme performed by the decoder 116, as well as output transform software that may be run by the output transformer 114, in order to transform the sensor data into a haptic output signal suitable for the haptic output device 118 in the playback device. In an embodiment, a player software application may incorporate the sensor decoding scheme. The player software may rely on the output transform software being resident or otherwise pre-installed on the playback device, and such output transform software may transform the sensor data into the haptic output signal suitable for the haptic output device 118 in the playback device. In other words, the output transformer 114 and/or decoder 116 may be located on the playback device.

In an embodiment, a player software application may rely on the playback device's operating system software to perform the media playback, which incorporates the sensor decoding scheme. The operating system software may rely on the output transform software being resident or otherwise pre-installed on the playback device, such output transform software transforming the sensor data into a haptic output signal suitable for the haptic output device 118 in the playback device. The viewer may then experience haptic sensations associated with the viewing of the performance, such haptic sensations being produced by the output transform software.

In an embodiment, the output transform software may include some of the sensor data, while other sensor data is ignored. For example, the gyroscope data may be included, while the contact pressure sensor data may be ignored. The magnitudes of the acceleration data may be computed by computing the vector magnitude of X-Y-Z acceleration components. This acceleration magnitude signal may then be band-pass filtered such that only acceleration magnitude signals in the 20-200 Hz range are output, with other frequency content filtered out. The filtered acceleration signal may then be put through a soft-knee compression algorithm to gently clip the output magnitudes between +6 and −6 gees, then all negative signals may be zeroed/ignored, and the resultant compressed, single-sided output signal may be used to control a magnitude of vibration provided by the haptic output device between 0-100% vibration. In this way, the viewer may feel a representation of the acceleration variants felt by the performer's snowboard.

In an embodiment, the acceleration data, gyroscope data, and contact pressure sensor data may be combined into a haptic output signal in the following way. Whenever the contact pressure is low, the snowboarder may be assumed to be jumping and therefore all haptic output is zeroed out. When the contact pressure is significant, the contact pressure may be multiplied by the acceleration magnitude. This output may then be multiplied by the change in orientation signal (the first time derivative of the orientation heading, derived from the gyroscope signal) to obtain an "activity intensity" signal. This signal may then be filtered and compressed in such a way so as to obtain a reasonable representation of the range of sensations experienced by the performer during the snowboarding activity, and the signal may be applied to the playback device's haptic output device 118.

In an embodiment, whenever the contact pressure is low, the snowboarder may be assumed to be jumping and therefore all haptic output is zeroed out. When the contact pressure is significant, the acceleration magnitude may be band pass filtered in the 100-200 Hz range, for example, and its output range may be highly compressed using a hard-knee compressor. This signal may be applied to the playback device's haptic output device 118. The viewer holding or otherwise in contact with the haptic output device 118 may then feel the sensations produced by the output transformer 114 and output by the haptic output device 118.

In accordance with embodiments of the invention, a plurality of sensors 102 may be used as part of the system 100 described above. The sensors 102 may be stand-alone sensors, such as accelerometers, gyroscopes, Inertial Measurement Units ("IMU"), contact sensors, etc., that may be attached to the subject of the event being recorded. For example the sensors 102 may be attached to the subject athlete's or user's body or apparel, such as a helmet, belt, shoe, boot, etc., or attached to his/her sports equipment, such as a bike, snowboard, skis, etc. The sensors 102 may be embedded in other wearable equipment carried by the user during his/her ride or movement, such as a smartphone, action camera, smart watch, etc.

Figure 2:
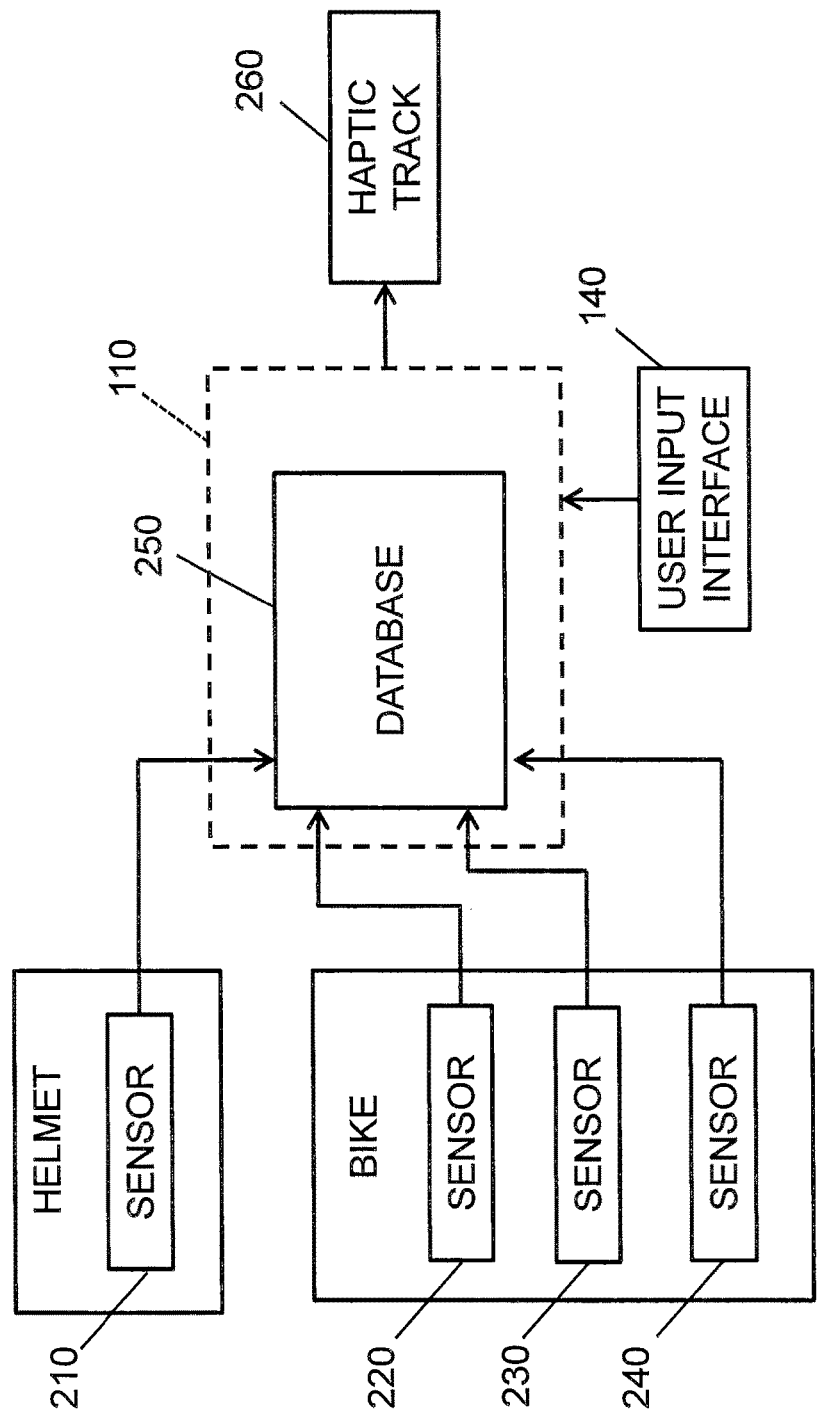
FIG. 2 is a schematic illustration of a portion of the system of FIG. 1 according to embodiments of the invention.

FIG. 2 is a schematic illustration of an implementation of the invention. A first sensor 210 may be attached to, for example, a biker's helmet, a second sensor 220 may be attached to, for example, a front fork that supports a front wheel of the bike, a third sensor 230 may be attached to, for example, a main frame of the bike, and a fourth sensor 240 may be attached to, for example, a rear fork that supports the rear wheel of the bike. The data captured by the sensors 210, 220, 230, 240 may be stored or logged on the device or sensor, or streamed (for example wirelessly) in real-time to a remote database 250, which may be part of the processor 110 described above. The audio tracks captured from different audio recorders 106 that are fixed in the environment may also be considered as sensory data that can be used to create the haptics. A haptic track 260 that is generated may be embedded with the video or stored on a remote server to be streamed on the video playback. The haptic effects to be generated by the haptic output device 118 may also be created in real-time manner using the streamed data.

In an embodiment, the user may fix the different sensors 102 to his/her apparel and equipment in a way that will capture the most relevant data. The sensors' positions configuration may follow guidelines in accordance with embodiments of the invention, or in another embodiment may be done to fit the user's preferences (for more experienced users). The guidelines are based on which sensor fits which situation the best. For example, if a snowboarder wishes to capture the snow texture and render the snow texture as an effect added to his/her movie, the guidelines will tell the snowboarder to fix an accelerometer to his/her snowboard.

In order to synchronize all of the data channels and the media tracks, which include audio and video tracks, the user may have to perform a specific signature movement, such as three successive jumps, in a way to recognize the signature movement in all the sensors', and video and audio recorders' readings. The data synchronization is also possible by synchronizing all of the internal clocks of the sensors to the same timing, for sensors with internal clocks. After the sensor data and media content are acquired, the haptics track creation procedure may begin in accordance with embodiments of the invention described below.

In an embodiment, the user may specify the type of activity, such as biking, motocross, snowboarding, skiing, etc., then identify each sensor position that is used, such as an ankle, a bike fork, etc., each sensor type, such as IMU, accelerometer, audio, etc., and sampling rate, such as 200 Hz, via the user input device 140. In an embodiment, the positions and types of sensors may also be selected by the user from a menu or list of preset values established using the system's sensor configuration general guidelines and presented to the user via the user input device 140. In an embodiment, the type of sensor and sampling rate may also be identified automatically by the system 100 when the sensor is connected to the system 100, which may be done by reading a specific header embedded on the sensor that contains all of the important descriptors (i.e. "smart sensors"). The system 100 may then label each sensor by a number and automatically label its acquired data. The system 100 may also display a visual prototype of the equipment or apparel with an overlay of the positioning of the sensors and an illustration of the different axes channel of the sensors via the user input device 140.

For a specific scene, which may be selected by the user via the user input device 140, the user may select a specific type of haptic effect via the user input device 140. To do so, the user may specify the sensor position that he/she thinks will deliver the most relevant data to the scene, and also specifies the timings of the beginning and the end of the scene. By having the chosen sensor descriptors (type and position), the system 100 may suggest the different possible haptic effects (e.g. texture, bumps, signal envelope, etc.) that can be generated automatically from the data. The system 100 may also suggest one specific effect when given a preset pattern. For some specific effects, the user may need to select a specific data channel from the sensor (e.g. acceleration on a specific axis in the case of a three-dimensional accelerometer), as described in further detail below.

For example, in a "biking" activity, if the user chooses the sensor "fork," which is described as an accelerometer in the sensors table, the system may suggest "bump effects", "envelope effect", and "texture effect" via the user input device 140. If the user picks the "bump effects," the system 100 will ask the user which axis acceleration data to use (e.g., X axis) when deriving the haptics track 260. If a "texture effect" is desired, the system 100 will use the three acceleration channels available without asking the user for additional input. The associations between an activity, a sensor's position and type, and the possible effects may be preprogrammed in the processor 110 of the system 100 using expert knowledge. In an embodiment, the choice of the sensor to use in a scene may be done automatically by analyzing all the data related to the scene and choosing the channel that presents the most activity/entropy.

Given the type of the selected effect for the scene, the system 100 may need to use more information than from a single sensor in order to create a more compelling haptic effect. For example, when processing gyroscope data to create rotation effects, the system 100 may also use the acceleration data captured from the same position as the gyroscope, if available. The created effect will then reflect if the object's or athlete's rotation is done in the air, which would be a less intense effect.

After establishing the list of all of the scenes to be haptified with the desired sensors' information, the system 100 may retrieve the relevant sensory data from the database 250 and apply a specific algorithm for each type of effect, described in further detail below, which results in a haptic effects signal per scene. After creating the haptic effects for the different scenes, the system 100 concatenates the similar type effects in one track and then normalizes it by dividing it to its max value.

The different effects tracks may then be added to form the final haptic track 260. Each effect track may also be added with a given weight (e.g., 0 to 1) to reflect the importance given by the user to each effect type. For example, if the user wants to promote bump effects and make a texture effect more subtle, the user may give the first track associated with the bump effects a weight of 0.8 and a second track associated with the texture effect a weight of 0.5.

In an embodiment, the system 100 may create all of the possible haptic tracks for each of the sensors and channels for the whole clip duration based on the sensor's type and position. For example, for an accelerometer, the system may create a track for "texture effect", another track for "envelope effect" and a track per axis for the "bump effects."

In an embodiment, the user may be presented with the different created haptic tracks in a video editing software framework, such as ProTools, and may have the choice to edit and cut each track to create the final haptic track for the clip. The user may also adjust and tune the different tracks before mixing, as is done in audio editing. In an embodiment, the system 100 may analyze the created haptic tracks and assign each track to a part of the video when given the quantity of information/entropy in each track at a certain time.

In order to create relevant haptic effects for a specific activity, such as biking, motocross, snowboarding, skiing, etc., it is desirable to develop a different algorithm for each type of sensor and for each type of desired haptic effect, which will give the user more flexibility to choose the type of haptic effects he/she finds more compelling for each scene/clip. An effect may be associated with a specific event (hit, flip, etc.) in the scene/clip. The identification of the event in the sensor signals may be different, given the type of activity. For example, a bike hitting the ground creates a signature event in the three-dimensional acceleration signals that is different from the signature event created by a snowboard hitting the ice.

Figure 3:
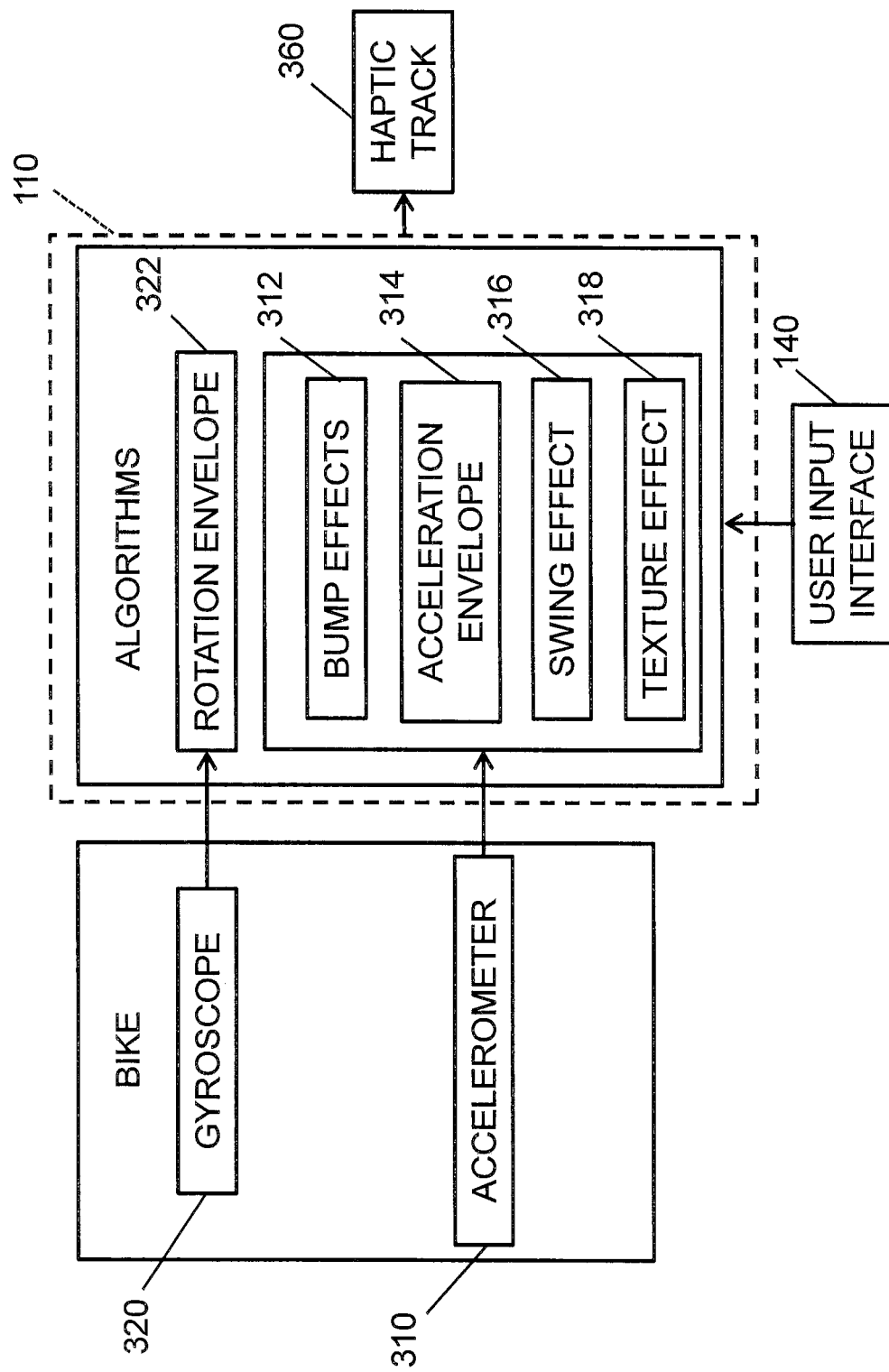
FIG. 3 is a schematic illustration of a portion of the system of FIG. 1 according to embodiments of the invention.

FIG. 3 illustrates a plurality of algorithms provided by embodiments of the invention that are used to adapt to different situations, as described below. The algorithms may be programmed in one or more modules in a processor, such as the processor 110 of the system 100 described above. The algorithms described herein may also be used in situations in which more than one sensor is used by using the methods described above. The following embodiments are provided as examples of different algorithms for different use cases and should not be considered to be limiting in any way.

For three-dimensional accelerations that may be sensed by an accelerometer (or accelerometers) 310 located on the object of interest, such as a bike, different types of events and effects may be distinguished and haptified. For example, a bump event, an acceleration envelope, a swing event and/or a texture effect experienced by the object of interest may be identified in the data signal output by the accelerometer 310, and a corresponding algorithm may be applied to the data signal to generate a haptic signal output to the haptic output device 118 that corresponds to the event, as described below.

A "bump" event occurs, for example, when a bike contacts the ground with great force after a maneuver or a snowboarder contacts the snow with great force after a jump. In the bike (or motocross) case, such an event is characterized by a strong peak (spike) in the vertical acceleration signal sensed by an accelerometer attached to the bike. Bumps may also result from sudden acceleration changes on any of the two other axes. In the case of snowboarding (or skiing), a bump event may be identified by spikes in both the vertical and the Medio-Lateral (ML) acceleration signals, and a low acceleration signal on the Anterior-Posterior (AP) axis. Two bump effects algorithms 312 may be used to take this into account.

A first algorithm, or so-called "simple bump" algorithm, is adapted for bike activity, motocross activity or any activity where a bump can be identified from a single axis acceleration, namely when the absolute value of the signal is greater than a preset threshold value, for example 5 g. The first algorithm uses only one axis acceleration signal and the user specifies the axis he/she is interested in haptifying. The preset value is adapted to the type of activity and to the position of the accelerometer on the apparel/equipment of the object of interest so as to integrate the possible signal attenuation.

The second algorithm, or so-called "three-axes bump" algorithm, uses the three axes acceleration signals in order to identify the bumps. The second algorithm starts by estimating the resultant acceleration value of two of the axes. Whenever this estimated resultant acceleration value is higher than a preset threshold, which is activity dependent, and the third axis acceleration is lower than its own preset threshold, a bump is spotted. The second algorithm is more suited for activities such as skiing or snowboarding.

Once the bump event is detected, the first and second bump effects algorithms 312 place a short (e.g., 60 ms) but full magnitude effect at the same timing as the event in a haptic track 360.

An acceleration envelope algorithm 314 may be used to haptify different types of events, such as an engine noise, small bumps experienced by a bike, etc. The acceleration envelope algorithm 314 uses a single axis acceleration signal or a resultant of any combination of the three axes signals from the sensor 310 and derives haptic effects from the signal by calculating the acceleration envelope using root mean square (rms), mean, or maximum values for successive windows. For this algorithm, the user may specify which of the three axes he/she wants to consider via the user input device 140 described above. The envelope will be calculated only when the signal is greater than a preset threshold (noise threshold per activity) and smaller than the "bump" threshold described above.

A swing event occurs in, for example, skiing and snowboarding activities when the skier or snowboarder drifts fast on the Medio Lateral axis. The swing event may be identified when the acceleration on the Medio Lateral axis is higher than a specific threshold. A swing effect algorithm 316 detects the event in the signal output from the sensor 310 and calculates the acceleration envelope, as described above, around this event (e.g., for 1 s), then uses the envelope to generate a corresponding haptic effect.

A texture effect algorithm 318 may be used to render a texture effect using accelerations along the three axes that are captured as close as possible to the surface target. For example, the texture haptic effect for snow is better derived using accelerations of the snowboard or ski itself. For a bike, it is typically better to derive the ground texture using accelerations from the fork (non-attenuated accelerations signals) of the bike. The three accelerations signals may be transformed from the time domain into the frequency domain using Fast Fourier Transform ("FFT") and added as vectors in that domain to form a single signal. The resultant signal may then be transferred back to the time domain, as is known in the art. Therefore, details of the transformation are not provided herein. The texture effect is generated by calculating the envelope of the resultant signal, as described above with respect to the acceleration envelope.

For sensors that are in the form of a three-dimensional gyroscope 320, a rotation envelope algorithm 322 may be used to haptify different type of events, such as a bike's handlebar rotations, a snowboard's 360° flips, a snowboard's sudden turns/stops, etc. The rotation envelope algorithm 322 uses a single axis rotation speed signal and derives haptic effects from the single axis rotation speed signal by calculating the signal envelope using root mean square (rms), mean, or maximum values for successive windows. For this algorithm, the user may specify which of the three axes he/she wants to consider. The envelope will be calculated only when the signal is bigger than a preset threshold (noise threshold per activity). In a steering wheel or handlebar rotation case, a lower threshold will allow eliminating slower non-event rotations, while a higher threshold implies haptifying only sudden fast movements that may correlate to "interesting events.".

By embedding a contact sensor underneath or in an athlete's shoes, underneath a snowboard, or on a bike seat, events such as when an athlete is jumping in the air and when the athlete is landing again (e.g., for Parkour, snowboarding, motocross, etc.) may be detected. The landing event, which is characterized by a spike in the contact sensor output signal, may be then haptified by adding a short intense effect, such as for about 50 ms. Detecting the athlete's airtime may influence tuning the intensity of the other effects derived from the other sensors. For example, a rotation envelope will be of less intensity when the athlete is in the air.

Embodiments of the invention described above provide a methodology that helps a user automatically derive haptic effects for a media piece he/she has captured. Although the examples described above generally focus on sports media in which one or more sensors capture data related to the action in the media piece, embodiments of the invention are not so limited. The system described above allows for processing of all of the sensor data with no or very little intervention from the user, and delivers a relevant haptics track that augments the media content and thus enhances the viewing experience.

Embodiments of the invention described above also provide a solution on how to use different sensors in an optimal way and how to create haptic effects from the combination of the different sensors at a certain time. Although the use of different sensors provides a better opportunity to create compelling haptics, the user may feel overwhelmed by the quantity of available data and may be confused on how to use the data at the same time, for example, when to use what sensor(s) and what algorithm to apply, when deriving haptics. Embodiments of the invention provide a sensor-to-haptics workflow when the athlete or equipment is equipped with different sensors and provides the link between the captured data and the haptic conversion algorithms, and thus optimize the procedure of creating haptics for user generated content from multiple sensors data. Embodiments of the invention guide the user through this procedure by using guidelines and suggestions when needed and also fuses the information coming from different sensors at moments in order to optimize the haptic effects creation.

Embodiments of the invention provide adapted algorithms for creating different haptic effects using sensor data in an effortless manner, which make the user's task easier. Embodiments of the invention allow the user to use data describing the action in order to infer the haptic effects, which allows the user to be sure that the haptic track created is related to the actual action. The different algorithms described above allow the user to create different types of effects easily, and then pick the effect he/she prefers.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A system comprising:
 a memory storing video data and sensor data, the video data including an image associated with an object, the sensor data measuring a movement of a sensor located on the object, the sensor data being acquired concurrently with the video data;
 a processor, coupled to the memory, configured to:
  read the sensor data from the memory, the sensor data including a first acceleration signal, a second acceleration signal, a third acceleration signal,
  identify a sensor type and a sensor position on the object,
  select an algorithm for generating a haptic effect, from a plurality of algorithms, based on the sensor type and the sensor position, each algorithm being configured to generate a different haptic effect for a particular sensor type and sensor position, the plurality of algorithms including a three-axes bump effect algorithm having a first preset threshold value and a second preset threshold value,
  create a haptic signal based on the sensor data and the selected algorithm, including:
   when the selected algorithm is the three-axes bump effect algorithm:
    estimate a resultant acceleration value of the first and second acceleration signals,
    identify bump events in the sensor data, each bump event being identified when the estimated resultant acceleration value is higher than the first preset threshold value and the third acceleration signal is lower than the second preset threshold value, and
    for each identified bump event, add a bump effect to the haptic signal, and
   transmit the haptic signal; and
 a haptic output device, coupled to the processor, configured to:
  receive the haptic signal, and
  generate the haptic effect based on the haptic signal.

2. The system according to claim 1, wherein the sensor data is acquired from an accelerometer, a gyroscope, an inertial measurement unit, or a contact sensor, and the plurality of algorithms include a single-axis bump effect algorithm, a swing effect algorithm, an acceleration envelope algorithm, a rotation envelope algorithm, a landing effect algorithm, or a texture effect algorithm.

3. The system according to claim 1, further comprising a user input device configured to allow a user of the system to indicate the sensor type.

4. The system according to claim 1, further comprising a user input device configured to allow a user of the system to select a scene within the video data.

5. The system according to claim 1, further comprising a user input device configured to allow a user of the system to select a desired haptic effect.

6. The system according to claim 4, wherein the processor is further configured to synchronize a video of the selected scene with the haptic signal.

7. The system according to claim 6, further comprising a display configured to display the video of the selected scene synchronized with the haptic effect generated by the haptic output device.

8. A method comprising:
 storing video data and sensor data in a memory, the video data including an image associated with an object, the sensor data measuring a movement of a sensor located on the object, the sensor data being acquired concurrently with the video data;
 reading the sensor data from the memory, the sensor data including a first acceleration signal, a second acceleration signal, a third acceleration signal;
 identifying a sensor type and a sensor position on the object;
 selecting an algorithm for generating a haptic effect, from a plurality of algorithms, based on the sensor type and the sensor position, each algorithm being configured to generate a different haptic effect for a particular sensor type and sensor position, the plurality of algorithms including a three-axes bump effect algorithm having a first preset threshold value and a second preset threshold value;
 creating a haptic signal based on the sensor data and the selected algorithm, including:
  when the selected algorithm is the three-axes bump effect algorithm:
   estimating a resultant acceleration value of the first and second acceleration signals,
   identifying bump events in the sensor data, each bump event being identified when the estimated resultant acceleration value is higher than the first preset threshold value and the third acceleration signal is lower than the second preset threshold value, and for each identified bump event, adding a bump effect to the haptic signal; and transmitting the haptic signal to a haptic output device that generates the haptic effect based on the haptic signal.

9. The method according to claim 8, further comprising synchronizing a selected scene within the video data with the haptic signal.

10. A system comprising:
a memory storing video data and sensor data, the video data including an image associated with an object during an event or activity, the sensor data measuring a movement of at least one sensor located on the object, the sensor data being acquired concurrently with the video data;
a processor, coupled to the memory, configured to:
read the sensor data from the memory, the sensor data including a first acceleration signal, a second acceleration signal, a third acceleration signal,
identify at least one of an event type or an activity type,
select an algorithm for generating a haptic effect, from a plurality of algorithms, based on at least one of the event type or the activity type, each algorithm being configured to generate a different haptic effect for a particular event type or activity type, the plurality of algorithms including a three-axes bump effect algorithm having a first preset threshold value and a second preset threshold value,
generate a haptic signal based on the sensor data and the selected algorithm, including:
when the selected algorithm is the three-axes bump effect algorithm:
estimate a resultant acceleration value of the first and second acceleration signals,
identify bump events in the sensor data, each bump event being identified when the estimated resultant acceleration value is higher than the first preset threshold value and the third acceleration signal is lower than the second preset threshold value, and
for each identified bump event, add a bump effect to the haptic signal, and
transmit the haptic signal; and
a haptic output device, coupled to the processor, configured to:
receive the haptic signal, and
generate the haptic effect based on the haptic signal.

11. The system according to claim 10, wherein the sensor is an accelerometer, a gyroscope, an inertial measurement unit, or a contact sensor.

12. The system according to claim 10, wherein the event type is a bump event, a swing event, an acceleration event, a rotation event, a landing event, or a texture contact event, and the plurality of algorithms include a single-axis bump effect algorithm, a swing effect algorithm, an acceleration envelope algorithm, a rotation envelope algorithm, a landing effect algorithm, or a texture effect algorithm.

13. The system according to claim 10, wherein the activity type is biking, motocross, snowboarding, or skiing.

14. The system according to claim 10, wherein the processor is further configured to synchronize a video of the event or activity with the haptic signal.

15. The system according to claim 14, further comprising a display configured to display the video of the event or activity synchronized with the haptic effect generated by the haptic output device.

16. The system according to claim 10, further comprising a user input device configured to provide input to the processor to select the haptic effect to be output by the haptic output device, the haptic effect including a bump effect, a swing effect, a texture effect, an airtime effect, an acceleration envelope, or a rotation envelope.

17. A method comprising:
storing video data and sensor data in a memory, the video data including an image of an object during an event or activity, the sensor data measuring a movement of a sensor located on the object, the sensor data being acquired concurrently with the video data;
reading the sensor data from the memory, the sensor data including a first acceleration signal, a second acceleration signal, a third acceleration signal;
identifying at least one of an event type or an activity type;
selecting an algorithm for generating a haptic effect, from a plurality of algorithms, based on at least one of the event type or the activity type, each algorithm being configured to generate a different haptic effect for a particular event type or activity type, the plurality of algorithms including a three-axes bump effect algorithm having a first preset threshold value and a second preset threshold value;
generating a haptic signal based on the sensor data and the selected algorithm, including:
when the selected algorithm is the three-axes bump effect algorithm:
estimating a resultant acceleration value of the first and second acceleration signals,
identifying bump events in the sensor data, each bump event being identified when the estimated resultant acceleration value is higher than the first preset threshold value and the third acceleration signal is lower than the second preset threshold value, and
for each identified bump event, adding a bump effect to the haptic signal; and
transmitting the haptic signal to a haptic output device that generates the haptic effect based on the haptic signal.

18. The method according to claim 17, further comprising synchronizing a video of the event or activity with the haptic signal.

19. The method according to claim 8, wherein the sensor data is acquired from at least one of an accelerometer, a gyroscope, an inertial measurement unit, or a contact sensor, and the plurality of algorithms include a single-axis bump effect algorithm, a swing effect algorithm, an acceleration envelope algorithm, a rotation envelope algorithm, a landing effect algorithm, or a texture effect algorithm.

20. The system according to claim 17, wherein the sensor data is acquired from at least one of an accelerometer, a gyroscope, an inertial measurement unit, or a contact sensor.

21. The system according to claim 17, wherein the event type is a bump event, a swing event, an acceleration event, a rotation event, a landing event, or a texture contact event, and the plurality of algorithms include a single-axis bump effect algorithm, a swing effect algorithm, an acceleration envelope algorithm, a rotation envelope algorithm, a landing effect algorithm, or a texture effect algorithm.

22. The system according to claim 17, wherein the activity type is biking, motocross, snowboarding, or skiing.

* * * * *